(12) United States Patent
Huang et al.

(10) Patent No.: US 10,303,157 B2
(45) Date of Patent: May 28, 2019

(54) ADDITIVE MANUFACTURING METHOD FOR THREE-DIMENSIONAL OBJECT

(71) Applicant: Industrial Technology Research Institute, Hsinchu (TW)

(72) Inventors: Wei-Chin Huang, Tainan (TW); Ching-Chih Lin, Tainan (TW); Tsung-Wen Tsai, New Taipei (TW); Kuang-Po Chang, Taichung (TW); Chih-Hsien Wu, Changhua County (TW); An-Li Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 449 days.

(21) Appl. No.: 14/981,978

(22) Filed: Dec. 29, 2015

(65) Prior Publication Data
US 2017/0176977 A1 Jun. 22, 2017

(30) Foreign Application Priority Data

Dec. 22, 2015 (TW) .............................. 104143072 A

(51) Int. Cl.
*G05B 19/4099* (2006.01)
(52) U.S. Cl.
CPC ..................... *G05B 19/4099* (2013.01); *G05B 2219/49023* (2013.01)
(58) Field of Classification Search
CPC .................. G05B 19/4099; G05B 2219/49023
USPC ....................................................... 264/308
See application file for complete search history.

(56) References Cited

U.S. PATENT DOCUMENTS

| 5,053,090 | A | * | 10/1991 | Beaman | .................. | B22F 3/004 |
| | | | | | | 156/272.8 |
| 5,155,324 | A | | 10/1992 | Deckard et al. | | |
| 5,345,391 | A | | 9/1994 | Hull et al. | | |
| 5,753,171 | A | | 5/1998 | Serbin et al. | | |

(Continued)

FOREIGN PATENT DOCUMENTS

CN 103353830 10/2013
CN 103751852 4/2014
(Continued)

OTHER PUBLICATIONS

"Office Action of Taiwan Counterpart Application", dated Apr. 7, 2017, p. 1-p. 5.

(Continued)

*Primary Examiner* — Kenneth M Lo
*Assistant Examiner* — Chad G Erdman
(74) *Attorney, Agent, or Firm* — JCIPRNET

(57) ABSTRACT

An additive manufacturing method for a 3D object is provided and includes (a) providing a 3D digital model of the 3D object; (b) dividing the 3D digital model into repeat arrangement of at least one type of polyhedral 3D units and an X-Y plane is an acute angle or an obtuse angle; (c) cutting the 3D digital model along a Z-axis into a plurality of 2D slices; (d) defining a scanning path covering one of the 2D slices; (e) providing an energy beam to a material on a working plane along the scanning path to form a construction layer corresponding to the one of the 2D slices; and (f) repeating the steps (d) and (e) to build up the 3D object by adding a plurality of construction layers in sequence.

18 Claims, 13 Drawing Sheets

(56) References Cited

U.S. PATENT DOCUMENTS

| | | | |
|---|---|---|---|
| 6,186,390 B1* | 2/2001 | Tadauchi | B23K 35/0227 228/56.3 |
| 6,505,089 B1 | 1/2003 | Yang et al. | |
| 6,676,892 B2 | 1/2004 | Das et al. | |
| 6,677,554 B2 | 1/2004 | Darrah et al. | |
| 8,034,279 B2 | 10/2011 | Dimter et al. | |
| 2002/0015654 A1 | 2/2002 | Das et al. | |
| 2003/0127436 A1 | 7/2003 | Darrah et al. | |
| 2008/0241392 A1 | 10/2008 | Dimter et al. | |
| 2013/0189028 A1* | 7/2013 | Gershenfeld | F16B 3/00 403/345 |
| 2013/0280547 A1* | 10/2013 | Brandl | B22F 3/1055 428/565 |
| 2014/0145522 A1* | 5/2014 | Gershenfeld | F16B 1/00 310/10 |
| 2014/0163717 A1 | 6/2014 | Das et al. | |
| 2014/0242400 A1* | 8/2014 | Hoebel | B23K 26/0093 428/457 |
| 2014/0306380 A1* | 10/2014 | El-Siblani | B29C 67/0088 264/401 |
| 2015/0145177 A1* | 5/2015 | El-Siblani | B29C 67/007 264/497 |
| 2015/0210013 A1 | 7/2015 | Teulet | |
| 2015/0231825 A1* | 8/2015 | Swartz | B32B 5/26 428/156 |
| 2016/0067928 A1* | 3/2016 | Mark | B29C 67/0088 264/401 |
| 2016/0207111 A1* | 7/2016 | Robrecht | B22F 5/00 |
| 2016/0250810 A1* | 9/2016 | Lynch August | B29C 67/0088 700/98 |
| 2016/0288254 A1* | 10/2016 | Pettit | B23K 26/064 |
| 2016/0368220 A1* | 12/2016 | Dimatteo | B29C 67/0088 |
| 2017/0151719 A1* | 6/2017 | Swartz | B32B 5/02 |
| 2017/0304894 A1* | 10/2017 | Buller | B22F 3/105 |
| 2017/0312823 A1* | 11/2017 | Chang | B22F 3/1115 |
| 2017/0334133 A9* | 11/2017 | Swartz | B29C 64/153 |

FOREIGN PATENT DOCUMENTS

| | | |
|---|---|---|
| CN | 104057611 | 9/2014 |
| CN | 104148636 | 11/2014 |
| DE | 10233389 | 2/2003 |
| DE | 102007014683 | 10/2008 |
| EP | 0758952 | 4/1998 |
| EP | 1296776 | 4/2003 |
| EP | 1993812 | 11/2008 |
| TW | 506868 | 10/2002 |
| WO | 9208567 | 5/1992 |
| WO | 9531326 | 11/1995 |
| WO | 0191924 | 12/2001 |
| WO | 2008116518 | 10/2008 |
| WO | 2014125280 | 8/2014 |

OTHER PUBLICATIONS

Buchbinder et al., "Investigation on reducing distortion by preheating during manufacture of aluminum components using selective laser melting", Journal of Laser Applications, Feb. 2014, pp. 1-10.

Papadakis et al., "Numerical Computation of Component Shape Distortion Manufactured by Selective Laser Melting", Procedia CIRP, Aug. 25, 2014, pp. 90-95.

Shiomi et al., "Residual Stress within Metallic Model Made by Selective Laser Melting Process", CIRP Annals—Manufacturing Technology, vol. 53, Issue 1, 2004, pp. 195-198.

Kruth et al., "Assessing and comparing influencing factors of residual stresses in selective laser melting using a novel analysis method", Proceedings of the Institution of Mechanical Engineers, Part B: Journal of Engineering Manufacture, Mar. 8, 2012, pp. 1-12.

Anam et al., "Effect of Scan Pattern on the Microstructural Evolution of Inconel 625 during Selective Laser Melting", Conference: Solid Freeform Fabrication, Dec. 2014, pp. 363-376.

* cited by examiner

ADDITIVE MANUFACTURING METHOD FOR THREE-DIMENSIONAL OBJECT

CROSS-REFERENCE TO RELATED APPLICATION

This application claims the priority benefit of Taiwan application serial no. 104143072, filed on Dec. 22, 2015. The entirety of the above-mentioned patent application is hereby incorporated by reference herein and made a part of this specification.

BACKGROUND OF THE DISCLOSURE

Field of the Disclosure

The disclosure relates to an additive manufacturing method and an additive manufacturing method for a three-dimensional object.

Description of Related Art

A technique of using an additive manufacturing (AM) method to manufacture a three-dimensional (3D) object has been developed. Along with evolution of the additive manufacturing method, a name thereof is changed from rapid prototyping (RP) to rapid manufacturing (RM) or 3D printing (3DP). At the end of 2009, American Society for Testing and Materials (ASTM) officially names and classifies the techniques of the additive manufacturing method, and establishes related standards.

Presently, a mainstream technique of the additive manufacturing method that draws more attention is metal-laser additive manufacturing, though it faces a problem that a metal material of a finished product is not easy to ensure stability and no deformation.

In order to avoid thermal deformation of the product due to excessive concentration of laser heat, in the past practice, two scanning methods including stripes scanning and chess scanning are adopted to disperse thermal stress in the product. However, there are still considerable bottlenecks in control of the thermal stress.

Therefore, a novel manufacturing design and method are desired for improving the issue of thermal stress in the product.

SUMMARY OF THE DISCLOSURE

The disclosure is directed to an additive manufacturing method for a three-dimensional (3D) object, which improves uneven thermal stress between construction layers. In the disclosure, polyhedral 3D units are adopted to implement 3D stack, so as to evenly disperse the thermal stress between the construction layers. In this way, an amount of deformation of the 3D object is decreased, such that quality and stability thereof are improved. Meanwhile, evenness of axial strengths of the 3D object is enhanced.

The disclosure provides an additive manufacturing method for a three-dimensional (3D) object and includes steps of: (a) providing a 3D digital model of the 3D object; (b) dividing the 3D digital model of the 3D object into repeat arrangement of at least one type of polyhedral 3D units, wherein an included angle between at least one surface of each of the polyhedral 3D units and an X-Y plane is an acute angle or an obtuse angle; (c) cutting the 3D digital model along a Z-axis into a plurality of two-dimensional (2D) slices; (d) defining a scanning path covering one of the 2D slice; (e) providing an energy beam to a material on a working plane along the scanning path to form a construction layer corresponding to the one of the 2D slices; and (f) repeating the steps (d) and (e) to build up the 3D object by adding a plurality of construction layers in sequence.

The disclosure provides an additive manufacturing method for a 3D object including steps of: (a) providing a 3D digital model composed of a plurality of 3D units; (b) cutting the 3D digital model into a plurality of 2D slices, wherein each of the 2D slices comprises a plurality of slice units; and (c) performing additive manufacturing by sequentially providing an energy beam along a scanning path covering each of the 2D slices, so as to build up the 3D object by adding a plurality of construction layers corresponding to the 2D slices in sequence, wherein two adjacent slice units of each of the 2D slices have the scanning path in different scanning vectors.

The disclosure provides an additive manufacturing method for a 3D object including steps of: (a) providing a 3D digital model composed of a plurality of first 3D units and a plurality of second 3D units different from the first 3D units; (b) cutting the 3D digital model into a plurality of 2D slices, wherein each of the 2D slices comprises a plurality of first slice units corresponding to the first 3D units and a plurality of second slice units corresponding to the second 3D units; and (c) performing additive manufacturing by sequentially providing an energy beam along a scanning path covering each of the 2D slices, so as to build up the 3D object by adding a plurality of construction layers corresponding to the 2D slices in sequence, wherein the first slice units of each of the 2D slices have the scanning path in a first scanning vector, and the second slice units of each of the 2D slices have the scanning path in a second scanning vector different from the first scanning vector.

According to the above descriptions, a plurality of the polyhedral 3D units are used to implement 3D stacking, and an included angle between at least one surface of each of the polyhedral 3D units and an X-Y plane is an acute angle or an obtuse angle. Alternatively, a plurality of the 3D units are cut into a plurality of 2D slices to implement the 3D stacking, wherein each of the 2D units slices comprises a plurality of slice units. Alternatively, a plurality of the first 3D units and a plurality of the second 3D units different from the first 3D units are used to implement the 3D stacking. Therefore, the thermal stress can be evenly dispersed between the construction layers, so as to decrease a deformation amount of the 3D object. In this way, the quality and stability of the 3D object are improved, and evenness of axial strengths of the 3D object is enhanced.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The disclosure focuses on mitigating thermal stress deformation in laser additive manufacturing, and based on a novel scanning strategy, the residual thermal stress is dispersed between construction layers through 3D stacking of polyhedral 3D units. In this way, at least following technical effects are achieved: a deformation amount of an additive manufacturing product is decreased, damage of a support structure is avoided, quality and stability of the additive manufacturing product are improved, and evenness of axial strengths in the 3D object is improved.

The disclosure provides an additive manufacturing method for a three-dimensional (3D) object includes steps of: (a) providing a 3D digital model of the 3D object; (b) dividing the 3D digital model of the 3D object into repeat arrangement of at least one type of polyhedral 3D units, wherein an included angle between at least one surface of each of the polyhedral 3D units an X-Y plane is an acute angle or an obtuse angle; (c) cutting the 3D digital model along a Z-axis into a plurality of two-dimensional (2D) slices; (d) defining a scanning path covering one of the 2D slices; (e) providing an energy beam to a material on a working plane along the scanning path to form a construction layer corresponding to the one of the 2D slices; and (f) repeating the steps (d) and (e) to build up the 3D object by adding a plurality of construction layers in sequence.

The horizontal plane containing the X-axis and the Y-axis is a virtual reference plane in space, which is denoted by $P_{XY}$; the aforementioned working plane is a plane for actually manufacturing the 3D object, which is denoted by $P_W$; and the aforementioned 2D slices are a plurality of slice units, which is denoted by $P_{CS}$, a construction layer M formed on the working plane $P_W$ is a specific construction layer M formed according to the figure of the 2D slices. A plurality of embodiment of the disclosure is provided below with reference of following figures.

Figure 1:
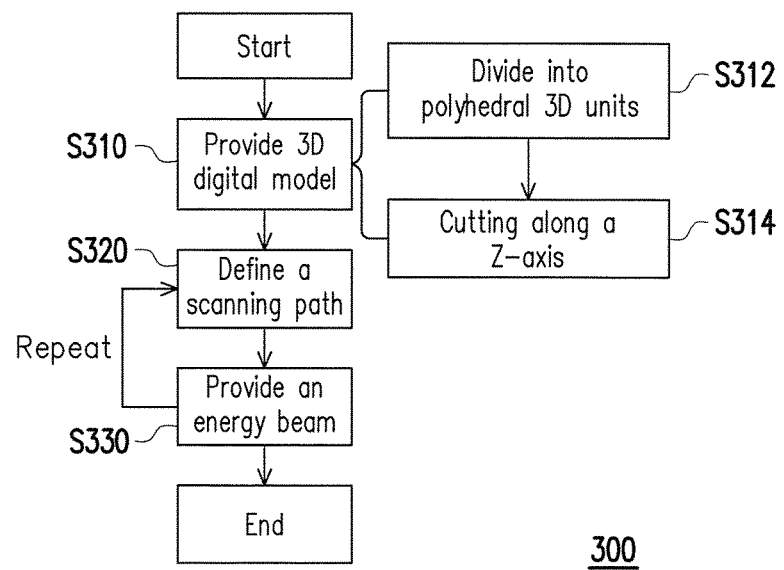
FIG. 1 is a flowchart illustrating an additive manufacturing method for a 3D object according to an embodiment of the disclosure.
Figure 2:
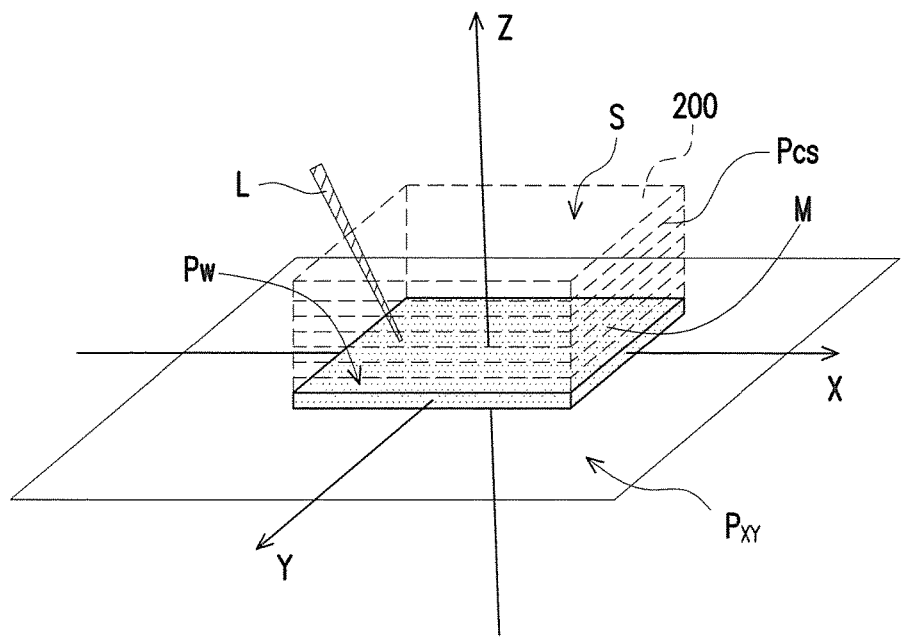
FIG. 2 is a schematic diagram of a 3D object formed layer-by-layer in a space defined by an X-axis, a Y-axis and a Z-axis perpendicular to each other.

FIG. 1 is a flowchart illustrating an additive manufacturing method for a 3D object according to an embodiment of the disclosure. FIG. 2 is a schematic diagram of a 3D object formed layer-by-layer in a space defined by an X-axis, a Y-axis and a Z-axis perpendicular to each other. According to the additive manufacturing method 300 for the 3D object of the disclosure, the 3D object 200 (shown in dash lines of FIG. 2) is manufactured in the space S defined by the X-axis, the Y-axis and the Z-axis perpendicular to each other by stacking a plurality of construction layers M layer-by-layer on the horizontal plane $P_{XY}$ (only one construction layer M is schematically illustrated in FIG. 2).

As shown in FIG. 1, the additive manufacturing method 300 for the 3D object 200 may include the step S310 for providing the 3D digital model of the 3D object, the step S320 for defining a scanning path covering one of the 2D slices, and the step S330 for providing the energy beam, where the step S310 for providing the 3D digital model may include a step S312 for dividing the 3D digital model into a plurality of polyhedral 3D units and a step S314 for cutting the 3D digital model along a Z-axis. Technical content of each step of the additive manufacturing method 300 for the 3D object 200 is described below.

Referring to FIG. 1, in the step S310, the 3D digital model of the 3D object 200 can be produced through computer graphics software, or produced by 3D scanning software of the 3D object 200 by directly scanning a contour of the 3D object 200. The 3D object 200 can be a regular or irregular 3D article, which may have a complex shape, inner flow channels and an inner structure, and operation and related settings of the 3D digital model of the 3D object 200 can be implemented through a computer.

It should be noted that in the step S312, the 3D digital model of the 3D object 200 is divided into repeat arrangement of at least one type of polyhedral 3D units, wherein an included angle between at least one surface of each of the polyhedral 3D units, wherein an included angle between at least one surface of each of the polyhedral 3D units and the horizontal plane $P_{XY}$ is an acute angle or an obtuse angle. Technical solutions of the disclosure are further disclosed below with reference of FIG. 3, FIG. 4 and FIG. 5A-FIG. 5C.

Figure 3:
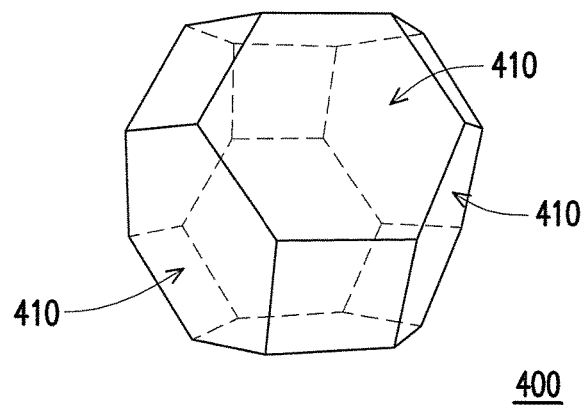
FIG. 3 is a schematic diagram of a polyhedral 3D unit (i.e. a truncated octahedron) according to an embodiment of the disclosure.
Figure 4:
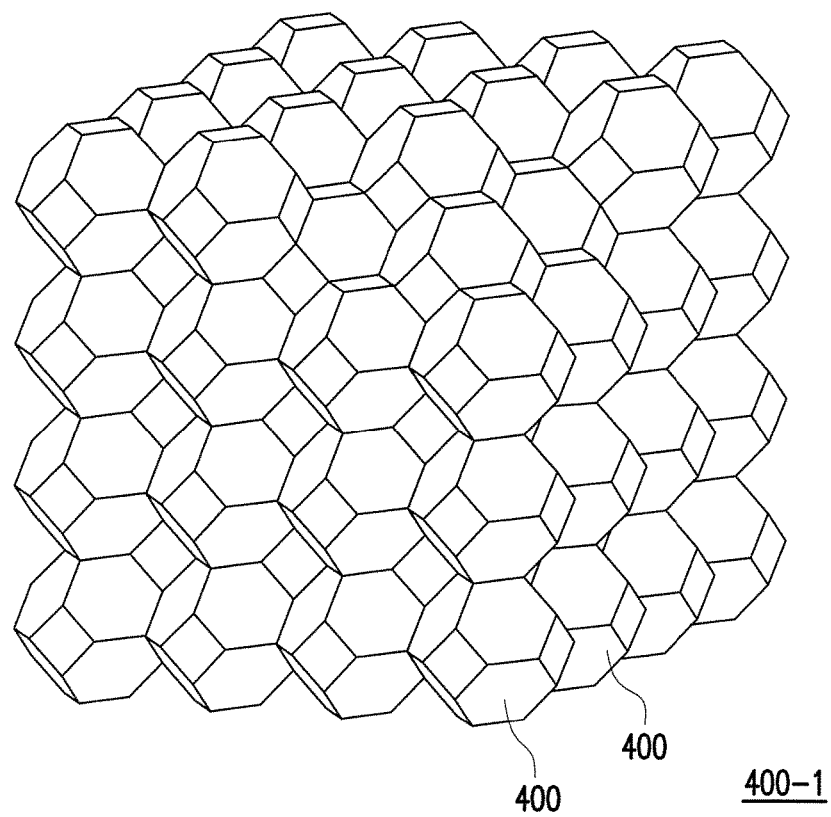
FIG. 4 is a schematic diagram of a 3D structure formed by a plurality of truncated octahedrons arranged in repeat arrangement.

FIG. 3 is a schematic diagram of a polyhedral 3D unit (i.e. a truncated octahedron) according to an embodiment of the disclosure. Referring to FIG. 3, the polyhedral 3D unit can be a truncated octahedron 400. The truncated octahedron 400 has 8 hexagons and 6 quadrangles. FIG. 4 is a schematic diagram of a 3D structure formed by a plurality of the truncated octahedrons arranged in repeat arrangement. In the 3D structure 400-1, the hexagons of the truncated octahedrons 400 face upward.

Figure 5A:
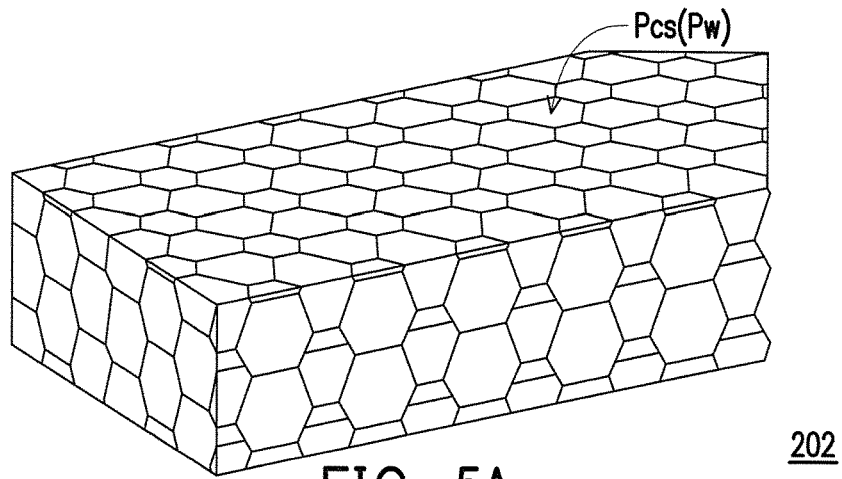
FIG. 5A is a schematic diagram of a 3D object.
Figure 5B:
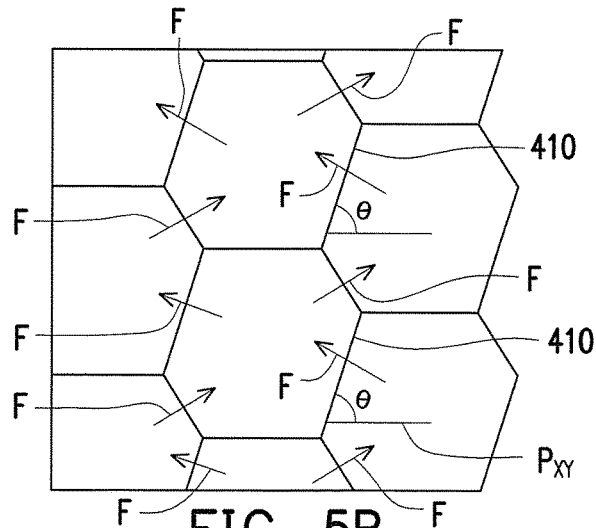
FIG. 5B is a side view of the 3D object of FIG. 5A.
Figure 5C:
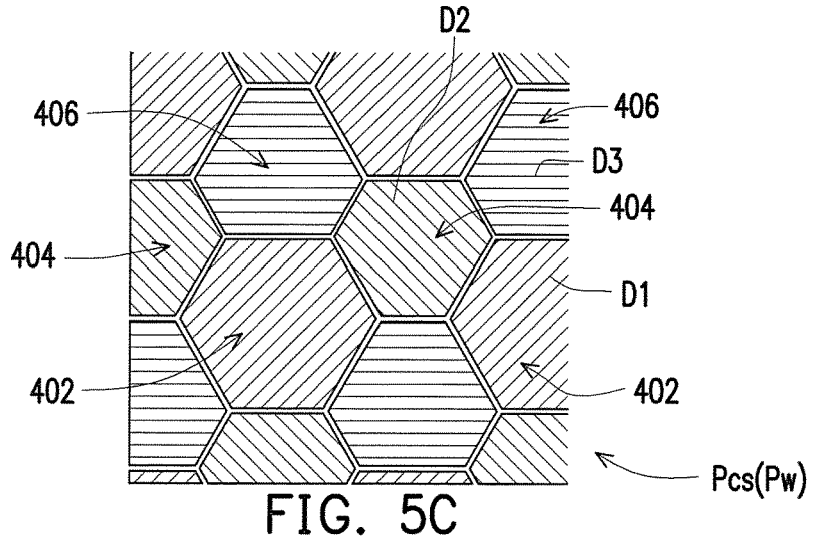
FIG. 5C is a top view of the 3D object of FIG. 5A.

FIG. 5A is a schematic diagram of the 3D object. FIG. 5B is a side view of the 3D object of FIG. 5A. FIG. 5C is a top view of the 3D object of FIG. 5A. Referring to FIG. 5A, it is known that the 3D object 202 manufactured by stacking a plurality of construction layers M is composed of a plurality of truncated octahedrons 400. According to the side view of FIG. 5B, when the truncated octahedrons 400 are vertically arranged along the Z-axis, an included angle θ between at least one surface 410 of each of the truncated octahedrons 400 and the horizontal plane $P_{xy}$ is an acute angle or an obtuse angle. In the present embodiment, the included angle θ is 60 degrees or a supplementary angle of the included angle θ, i.e. 120 degrees.

According to the above technical solution, the surfaces 410 of the truncated octahedrons 400 are connected to each construction layer M of the 3D object 200. In other words, as shown in FIG. 5B, in the 3D object 200 formed by stacking the truncated octahedrons 400, the thermal stress F produced in the additive manufacturing can be dispersed in different angles, i.e. dispersed in different axial directions. Therefore, the thermal stress F can be evenly dispersed between the construction layers M. In this way, accumulation of the thermal stress F is mitigated, so as to decrease a deformation amount of the 3D object 200, and improve product quality and stability. Meanwhile, evenness of axial strengths in the 3D object 200 is improved, so as to improve a whole strength of the 3D object 200.

Figure 6A:
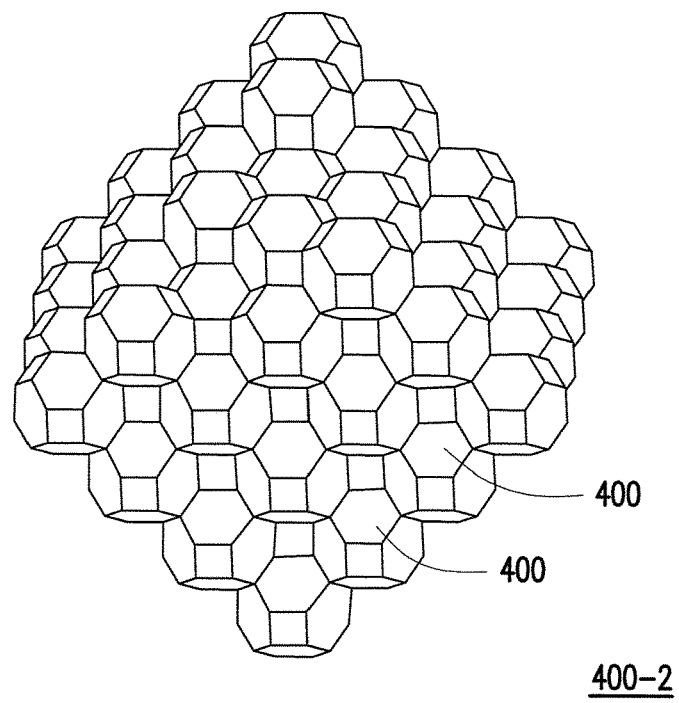
FIG. 6A and FIG. 6B are schematic diagrams of 3D structures formed by a plurality of truncated octahedrons arranged in repeat arrangement according to other embodiment of the disclosure.
Figure 6B:
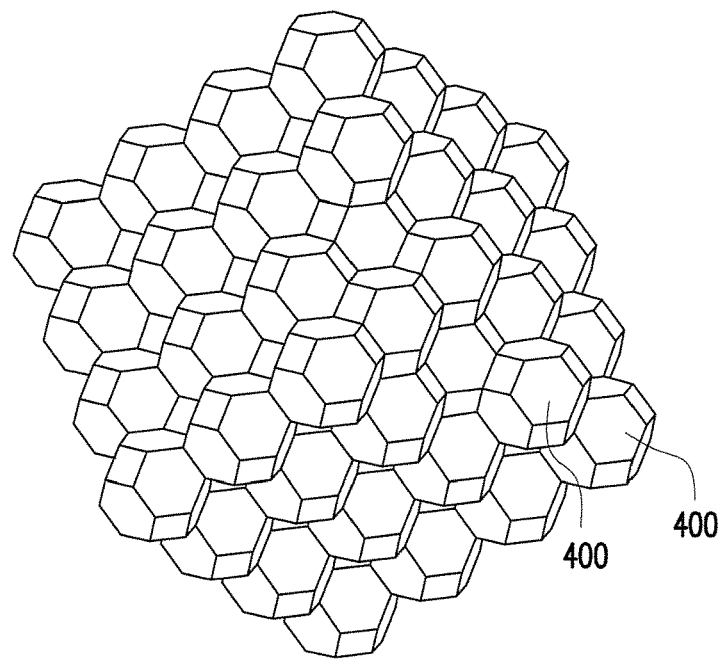

Moreover, as shown in FIG. 4, FIG. 5A and FIG. 5C, the truncated octahedrons 400 are arranged in a manner that the hexagons thereof face upward. However, in other embodiments, the arrangement of the truncated octahedrons 400 can be adjusted according to an actual design requirement of the 3D object 200. FIG. 6A and FIG. 6B are schematic diagrams of 3D structures formed by a plurality of truncated octahedrons arranged in repeat arrangement according to other embodiment of the disclosure. In the 3D structure 400-2 of FIG. 6A, the quadrangles of the truncated octahedrons 400 face upward. In the 3D structure 400-3 of FIG. 6B, the truncated octahedrons 400 are arranged in a specific angle, which is different to an arrangement angle of the truncated octahedrons 400 of FIG. 4.

Referring to FIG. 1, FIG. 2 and FIG. 5C, in the step S314, the 3D digital model is cut into a plurality of 2D slices $P_{CS}$ along a Z-axis. In an embodiment, each of the 2D slices $P_{CS}$ can be formed by a plurality of polygons. As shown in FIG. 5C, the 2D slices $P_{CS}$ can be composed of a plurality of hexagons 402, 404 and 406.

Referring to FIG. 2 and FIG. 5C, a method for setting the scanning path in the 2D slices $P_{CS}$ of one construction layer M is as follows. A plurality of polygons 402 have the scanning path in the scanning vector D1 and are respectively scanned by different energy beams L at the same time. A plurality of polygons 404 have the scanning path in the scanning vector D2 different from the scanning vector D1 and are respectively scanned by different energy beams L at the same time, and a plurality of polygons 406 have the scanning path in the scanning vector D3 different from the scanning vector D1 and scanning vector D2 and are also respectively scanned by different energy beams L at the same time. Moreover, the polygons 402 are scanned prior to the polygons 404 and the polygons 404 are scanned prior to the polygons 406. In detail, an example of the scanning path is to scan all of the polygons 402 along the scanning vector D1, scan all of the polygons 404 along the scanning vector D2, and scan all of the polygons 406 along the scanning vector D3.

In the 2D slices $P_{CS}$ of another construction layer M, another scanning path can be set according to the aforementioned settings. The scanning vectors D1-D3 in the 2D slices $P_{CS}$ of the other construction layer M can be rotated by a setting angle (i.e. rotated by an angle layer-by-layer) relative to the 2D slices $P_{CS}$ of the aforementioned construction layer M. Finally, the scan paths of all of the construction layers M sliced layer-by-layer along the Z-axis are combined to accomplish planning the scanning path of the 3D digital model of the 3D object 200.

The polygons 402-406 of each of the 2D slices $P_{CS}$ are scanned by the energy beam L one-by-one, i.e. a non-synchronous scanning method is adopted; and in other embodiments, a plurality of first polygons have the scanning path in the first scanning vector and a plurality of second polygons have the scanning path in the second scanning vector different from the first scanning vector, wherein the first polygons and the second polygons are respectively scanned by different energy beams at the same time, i.e. a synchronous scanning method is adopted. In the disclosure, the setting method of the scanning path is not limited by the disclosure, and the spirit of the disclosure is met as long as the polygons of each of the 2D slices $P_{CS}$ are scanned by the energy beam L one by one, and the energy beam L may scan along the scanning path to melt and cure related material to form the 3D object.

Referring to FIG. 1 and FIG. 2, the step S320 is to define a scanning path covering one of the 2D slices $P_{CS}$.

Referring to FIG. 1, FIG. 2, and FIG. 5A-FIG. 5C, in the step S330, the energy beam L is provided to a material (not shown) on the working plane $P_W$ along the scanning path, so as to form a specific construction layer M corresponding to the one of the 2D slices $P_{CS}$. The material can be metal, ceramics, polymer or a composite material thereof. The material can be suitably selected according to a design requirement of the 3D object 200 and setting parameters of the energy beam L. The material is heated and sintered by the energy beam L, and is cured to form the construction layer M. Then, the step S320 of defining a scanning path covering one of the 2D slices $P_{CS}$ and the step S330 of providing the energy beam L are repeated to add a plurality of the construction layers M in sequence to build up the 3D object 202 shown in FIG. 5A.

In an embodiment, the step S330 and repeating the steps S320 and the step S330 may adopt an additive manufacturing technique of powder bed melting, which includes selective laser sintering (SLS), selective laser melting (SLM), direct metal laser sintering (DMLS) or electro beam melting (EBM). In another embodiment, the step S330 and repeating the steps S320 and the step S330 may adopt an additive manufacturing technique of direct energy deposition, which includes laser engineering net shaping (LENS) and 3D laser cladding.

As shown in FIG. 2, the energy beam L can be a laser beam, an electron beam, an electric arc, or a combination thereof. Moreover, a scanning speed of the energy beam L can be between 1 mm/s and 100 m/s, and a power density of the energy beam L is smaller than or equal to $10^{12}$ W/cm$^3$. The above description is a general description of the additive manufacturing method 300 of the 3D object 200 of the disclosure.

Moreover, a relationship between the size of the 3D structure 400-1 of FIG. 4 and the size of the 3D object 202 of FIG. 5A can be suitably adjusted to manufacture the 3D object 202. For example, the size of the 3D structure 400-1 of FIG. 4 can be greater than the size of the 3D object 202 of FIG. 5A, in this case, after the step S320 of defining a scanning path covering one of the 2D slices and the step S330 of providing the energy beam performed relative to the 3D structure 400-1 of FIG. 4, as long as a part of the 3D structure 400-1 that is not sintered and shaped is removed, the 3D object 202 of FIG. 5A is obtained.

Moreover, the size of the 3D structure 400-1 of FIG. 4 can also be close to or slightly smaller than the size of the 3D object 202 of FIG. 5A. Similarly, after the step S320 of defining a scanning path covering one of the 2D slices and the step S330 of providing the energy beam performed relative to the 3D structure 400-1 of FIG. 4, as long as a mending step is performed to mend missing parts at periphery of the 3D structure 400-1 (additional step S320 of defining a scanning path covering one of the 2D slices and step S330 of providing the energy beam can be performed), the 3D object 202 of FIG. 5A is obtained. An advantage of such method is to effectively decrease a usage amount of the material.

In an embodiment, when the size of the 3D structure 400-1 of FIG. 4 is slightly smaller than the size of the 3D object 202 of FIG. 5A, a plurality of mending units (not shown) can be further provided on the missing parts at the periphery of the 3D structure 400-1 (the 3D digital model) to form the 3D object 202. A size of each of the mending units can be smaller than a size of each of the 3D units (i.e. the truncated octahedron 400). In this way, the missing parts at the periphery of the 3D structure 400-1 (the 3D digital model) can be mended to accomplish manufacturing the 3D object 202. The mending units and the truncated octahedrons 400 may be of the same type, and are not limited to integrity and size. Namely, the mending units can be incomplete 3D units (truncated octahedrons), and the size of the mending units can be smaller than the size of the 3D unit (the truncated octahedron 400).

According to the above descriptions, in the additive manufacturing method 300 for the 3D object 200 of the disclosure, the included angle θ between the surface 410 of the truncated octahedron 400 and the horizontal plane $P_{XY}$ is 60 degrees or 120 degrees (an acute angle or an obtuse angle). In this way, the thermal stress can be evenly dispersed between a plurality of the construction layers M, so as to decrease the deformation amount of the 3D object 200 and improve quality and stability thereof. Meanwhile, evenness of axial strengths of the 3D object 200 is improved. Moreover, along with usage of different polyhedral 3D units, as long as the included angle θ between at least one surface of each of the polyhedral 3D unit and a layer slicing plane (i.e. the horizontal plane $P_{XY}$) is an acute angle or an obtuse angle, the technical effect of the disclosure is achieved, and the included angle θ can be adjusted according to an actual product characteristic. In an embodiment the included angle θ can be greater than 0 degree and smaller than 90 degrees; and in another embodiment, the included angle θ can be greater than 90 degrees and smaller than 180 degrees.

In other embodiments, the polyhedral 3D unit can be one of a tetrahedron, a pentahedron, a hexahedron, a heptahedron, an octahedron, a truncated octahedron, a quadrangle antiprism, a hexagonal prism, an enneahedron, a decahedron, an octagonal prism, a hendecahedron, a dodecahedron, a rhombic dodecahedron, a tetrakaidecahedron, a pentadecahedron, a hexadecahedron, an octadecahedron, an icosahedron, a great rhombicuboctahedron, a truncated cube, a triacontahedron, and a combination thereof. It should be noted that the polyhedral 3D unit is not limited to the aforementioned examples. Other embodiments of the polyhedral 3D unit are introduced below, though the disclosure is not limited thereto.

[Rhombic Dodecahedron]

Figure 7:
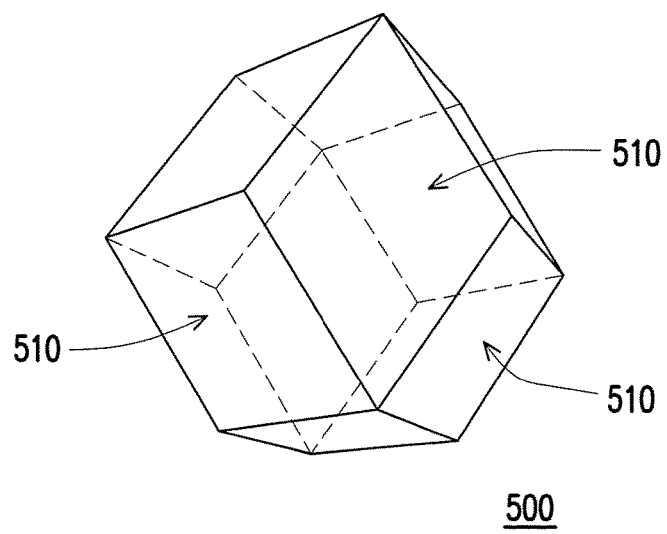
FIG. 7 is a schematic diagram of a polyhedral 3D unit (i.e. a rhombic dodecahedron) according to another embodiment of the disclosure.
Figure 8:
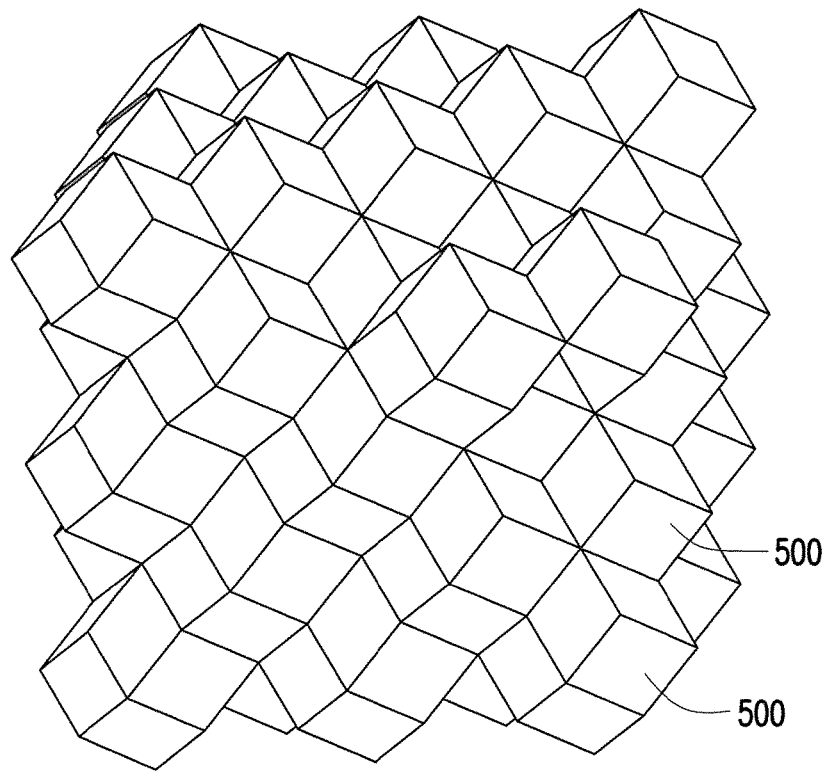
FIG. 8 is a schematic diagram of a 3D structure formed by a plurality of rhombic dodecahedrons arranged in repeat arrangement.

FIG. 7 is a schematic diagram of a polyhedral 3D unit (i.e. a rhombic dodecahedron) according to another embodiment of the disclosure. As shown in the embodiment of FIG. 7, the polyhedral 3D unit can be a rhombic dodecahedron 500. FIG. 8 is a schematic diagram of a 3D structure 500-1 formed by a plurality of rhombic dodecahedrons arranged in repeat arrangement. Similarly, a structural arrangement of the rhombic dodecahedrons 500 can be adjusted according to an actual design requirement of the 3D object.

Figure 9A:
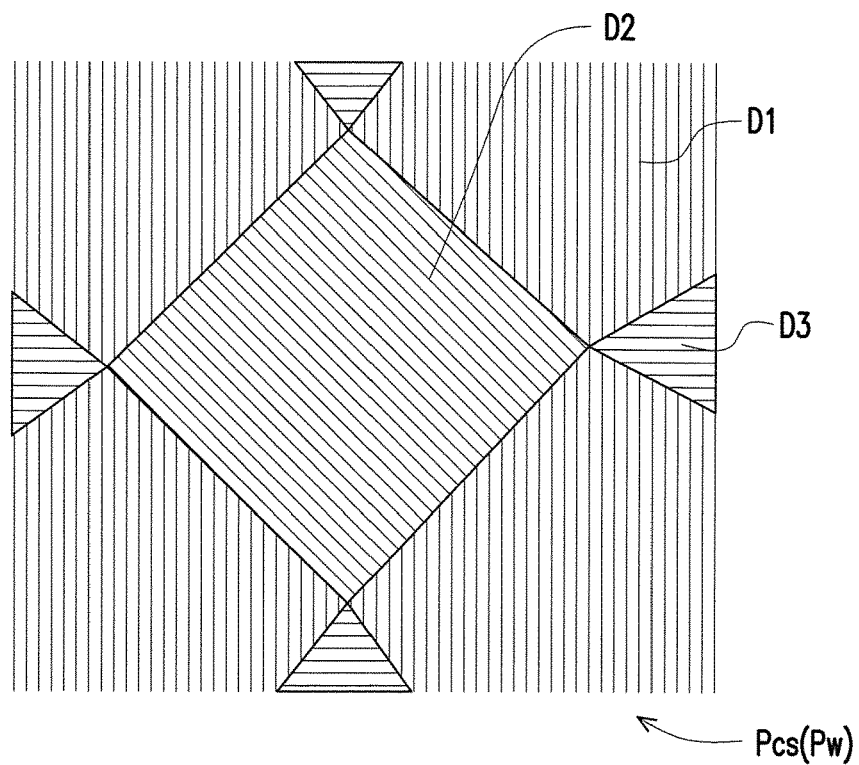
FIG. 9A is a top view of a 3D structure 500-1.
Figure 9B:
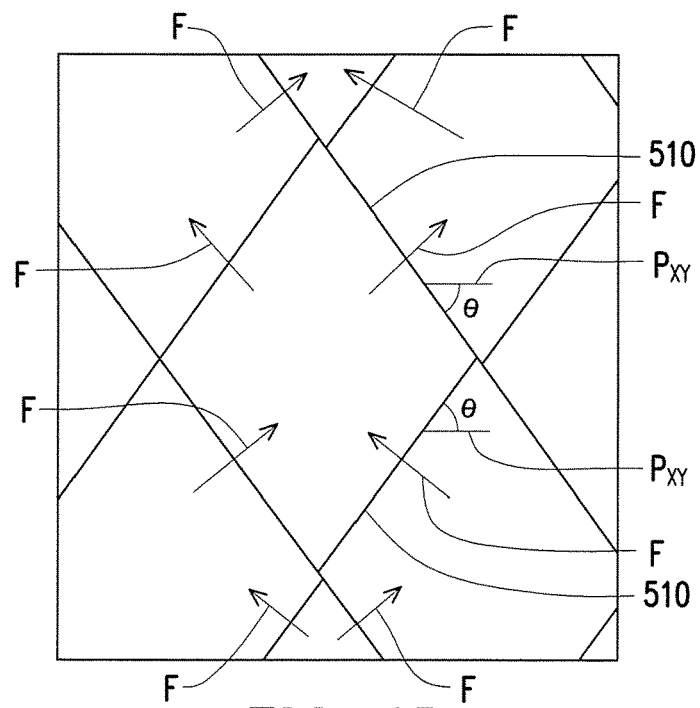
FIG. 9B is a side view of the 3D structure 500-1.

FIG. 9A is a top view of the 3D structure 500-1. FIG. 9B is a side view of the 3D structure 500-1. In the 3D structure 500-1 shown in FIG. 8, when a rhombic surface of the rhombic dodecahedron 500 is placed in the middle, and a square surface thereof is placed on the top, and a top view of the arranged rhombic dodecahedrons 500 is shown as FIG. 9A. Similar to the aforementioned embodiment of the truncated octahedron 400, each of the 2D slices $P_{CS}$ formed by slicing each rhombic dodecahedron 500 along the Z-axis is composed of a plurality of polygons (for example, the rhombus shown in FIG. 9A), and each polygon has the respective scanning vectors D1-D3.

A side view of the arranged rhombic dodecahedrons 500 is shown as FIG. 9B. Similarly, an included angle θ between at least one surface 510 of each of the rhombic dodecahedron 500 vertically arranged along the Z-axis and the horizontal plane $P_{XY}$ containing the X-axis and the Y-axis is an acute angle or an obtuse angle. It is known that the included angle θ between the surface 510 of each of the rhombic dodecahedron 500 and the horizontal plane $P_{XY}$ is 45 degrees or 135 degrees. Through a combination of different angles, the thermal stress F remained in internal of the 3D object can be dispersed along each axial direction during the additive manufacturing process.

[Hexagonal Prism]

Figure 10:
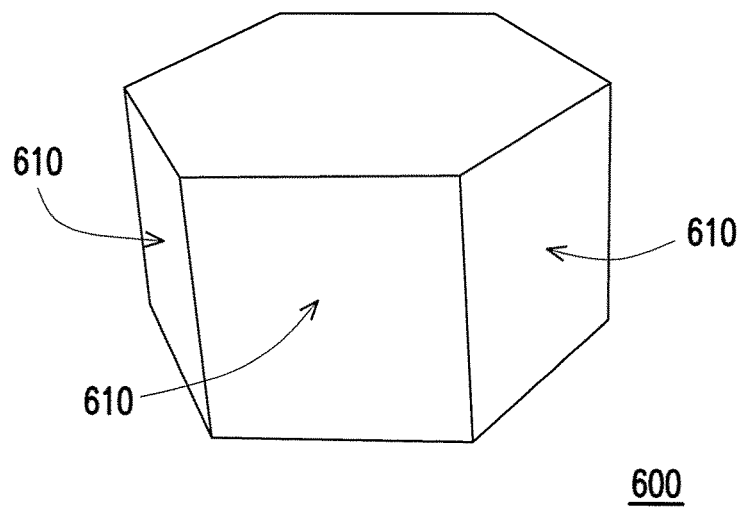
FIG. 10 is a schematic diagram of a polyhedral 3D unit (i.e. a hexagonal prism) according to still another embodiment of the disclosure.
Figure 11:
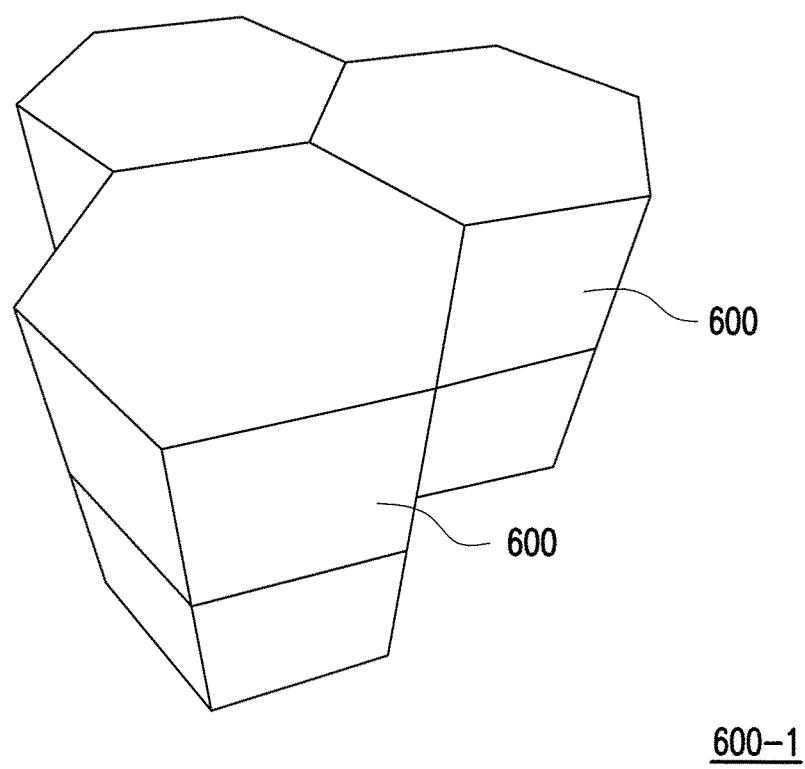
FIG. 11 is a schematic diagram of a 3D structure formed by a plurality of hexagonal prisms arranged in repeat arrangement.

FIG. 10 is a schematic diagram of a polyhedral 3D unit (i.e. a hexagonal prism) according to still another embodiment of the disclosure. As shown in the embodiment of FIG. 10, the polyhedral 3D unit can be a hexagonal prism 600. FIG. 11 is a schematic diagram of a 3D structure 600-1 formed by a plurality of hexagonal prisms arranged in repeat arrangement. Similarly, a structural arrangement of the rhombic dodecahedrons 600 can be adjusted according to an actual design requirement of the 3D object.

Figure 12A:
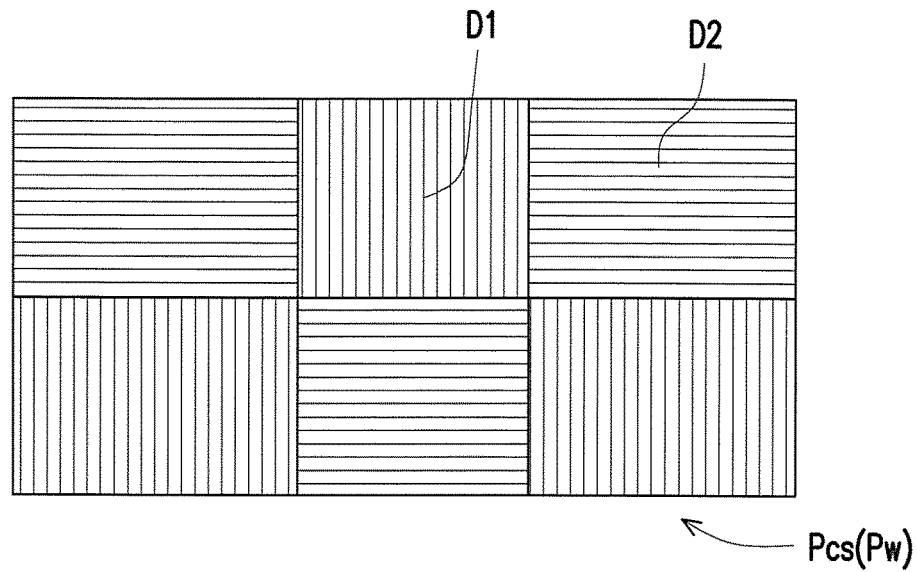
FIG. 12A is a top view of a 3D structure 600-1.
Figure 12B:
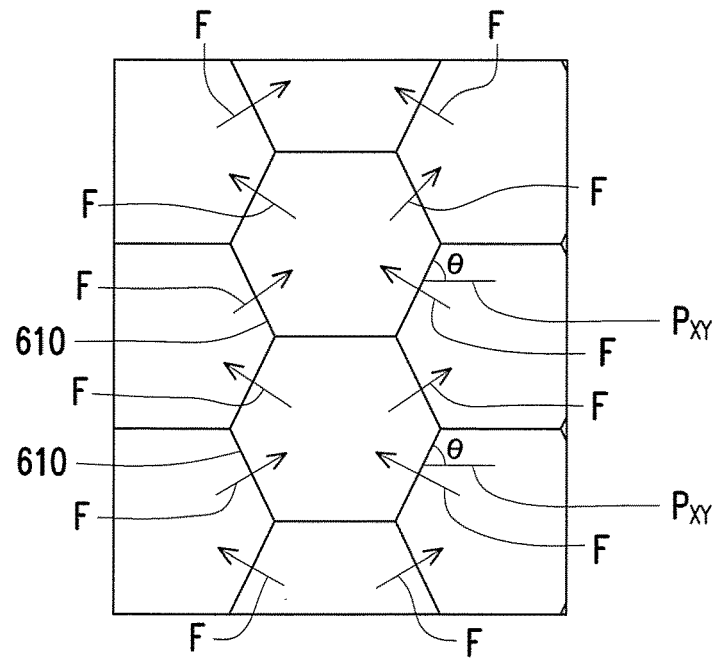
FIG. 12B is a side view of the 3D structure 600-1.

FIG. 12A is a top view of the 3D structure 600-1. FIG. 12B is a side view of the 3D structure 600-1. In order to disperse the thermal stress remained in internal of the 3D object through a combination of different angles during the additive manufacturing process, a hexagon surface is placed in the middle, and a rectangle surface thereof is placed on the top, and a top view of the arranged hexagonal prisms 600 is shown as FIG. 12A, which is formed by rectangles with dynamically varied sizes. Similar to the aforementioned embodiment of the truncated octahedron 400, each of the 2D slices $P_{CS}$ formed by cutting each hexagonal prism 600 along the Z-axis is composed of a plurality of polygons (for example, the quadrangles shown in FIG. 12A), and each quadrangle has the respective scanning vectors D1-D2.

A side view of the arranged hexagonal prisms 600 is shown as FIG. 12B. Similarly, an included angle θ between at least one surface 610 of each of the hexagonal prism 600 and the horizontal plane $P_{XY}$ is an acute angle or an obtuse angle. It is known that the included angle θ between the surface 610 of each hexagonal prism 600 and the horizontal plane $P_{XY}$ is 60 degrees. Through a combination of different angles, the thermal stress F remained in internal of the 3D object can be dispersed along each axial direction during the additive manufacturing process.

[Pyritohedron]

Figure 13:
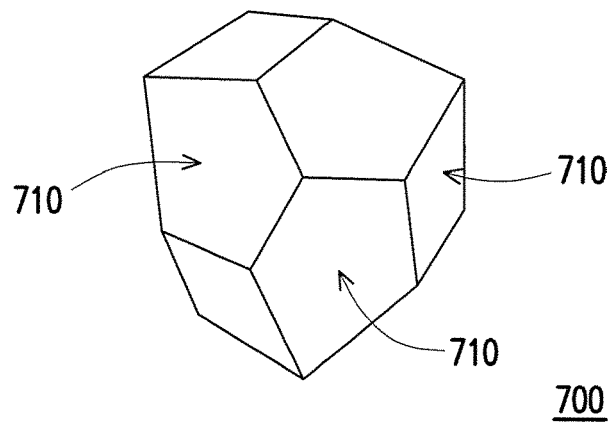
FIG. 13 is a schematic diagram of a polyhedral 3D unit (i.e. a pyritohedron) according to still another embodiment of the disclosure.
Figure 14:
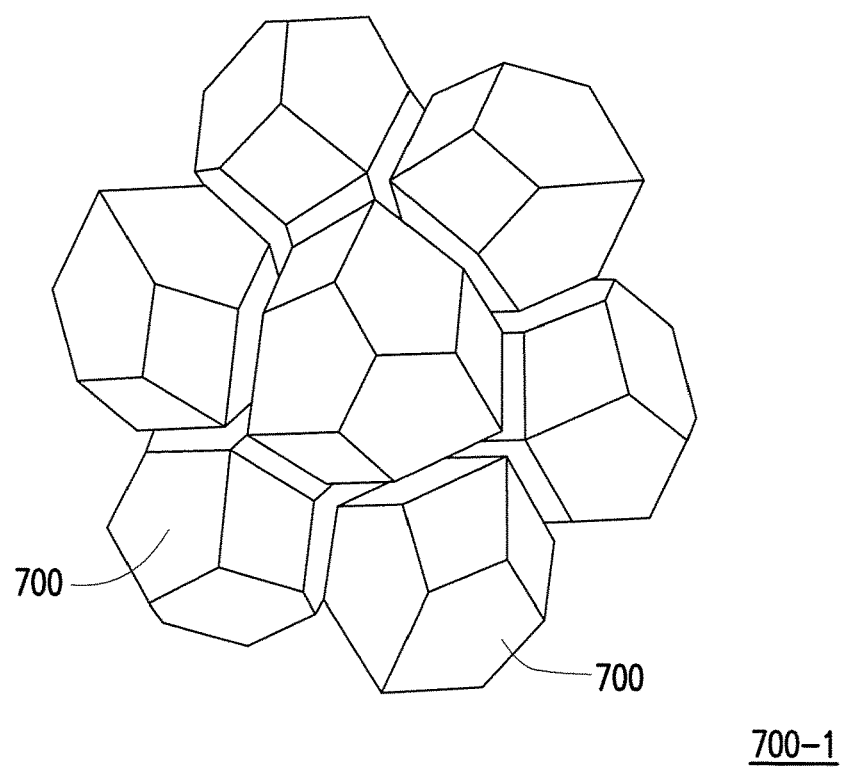
FIG. 14 is a schematic diagram of a 3D structure formed by a plurality of pyritohedrons arranged in repeat arrangement.

FIG. 13 is a schematic diagram of a polyhedral 3D unit (i.e. a pyritohedron) according to still another embodiment of the disclosure. As shown in the embodiment of FIG. 13, the polyhedral 3D unit can be a pyritohedron 700. FIG. 14 is a schematic diagram of a 3D structure 700-1 formed by a plurality of pyritohedrons arranged in repeat arrangement. Similarly, a structural arrangement of the pyritohedrons 700 can be adjusted according to an actual design requirement of the 3D object.

Similarly, an included angle between at least one surface 710 of each of the pyritohedron 700 and the horizontal plane containing the X-axis and the Y-axis is an acute angle or an obtuse angle. In this way, through a combination of different angles, the thermal stress remained in internal of the 3D object can be dispersed along each axial direction during the additive manufacturing process.

[Combination of a Plurality of Types of Polyhedral 3D Units]

Figure 15:
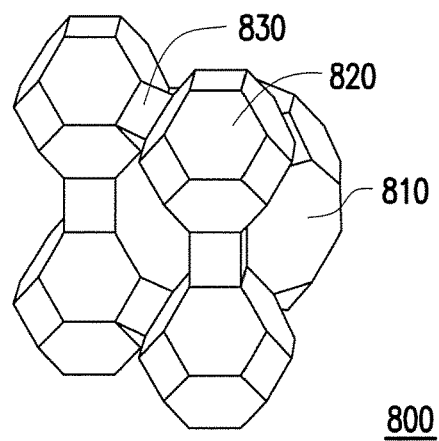
FIG. 15 is a schematic diagram of a cantitruncated cube stacking arrangement according to an embodiment of the disclosure.

In the disclosure, a combination of a plurality of types of polyhedral 3D units can be used to construct the 3D structure of the 3D object. FIG. 15 is a schematic diagram of a cantitruncated cube stacking arrangement according to an embodiment of the disclosure. As shown in FIG. 15, the cantitruncated cube stacking arrangement 800 is formed by stacking great rhombicuboctahedrons 810, truncated octahedrons 820 and cubes 830 in a proportion of 1:1:3.

Figure 16:
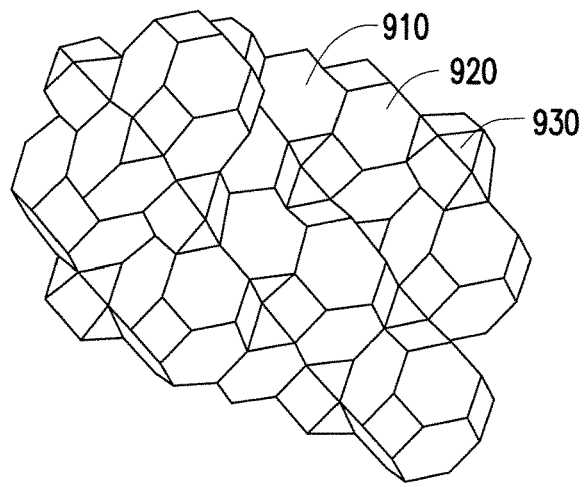
FIG. 16 is a schematic diagram of a cantic cubic honeycomb stacking arrangement according to an embodiment of the disclosure.

FIG. 16 is a schematic diagram of a cantic cubic honeycomb stacking arrangement according to an embodiment of the disclosure. As shown in FIG. 16, the cantic cubic honeycomb stacking arrangement 900 is formed by stacking three types of polyhedral 3D units of truncated tetrahedrons 910, truncated octahedrons 920, tetrakaidecahedrons 930, etc.

Figure 17:
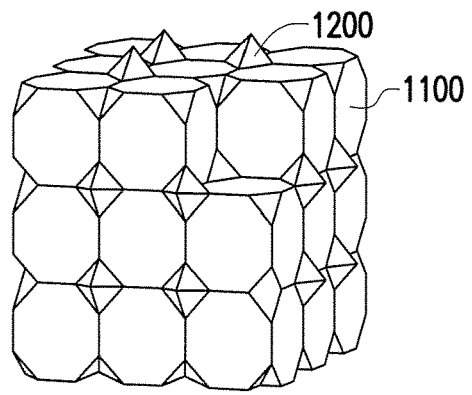
FIG. 17 is a schematic diagram of a truncated cube stacking arrangement according to an embodiment of the disclosure.

FIG. 17 is a schematic diagram of a truncated cube stacking arrangement according to an embodiment of the disclosure. As shown in FIG. 17, the truncated cube stacking arrangement 1000 is formed by stacking truncated cubes 1100 and regular octahedrons 1200.

Figure 18:
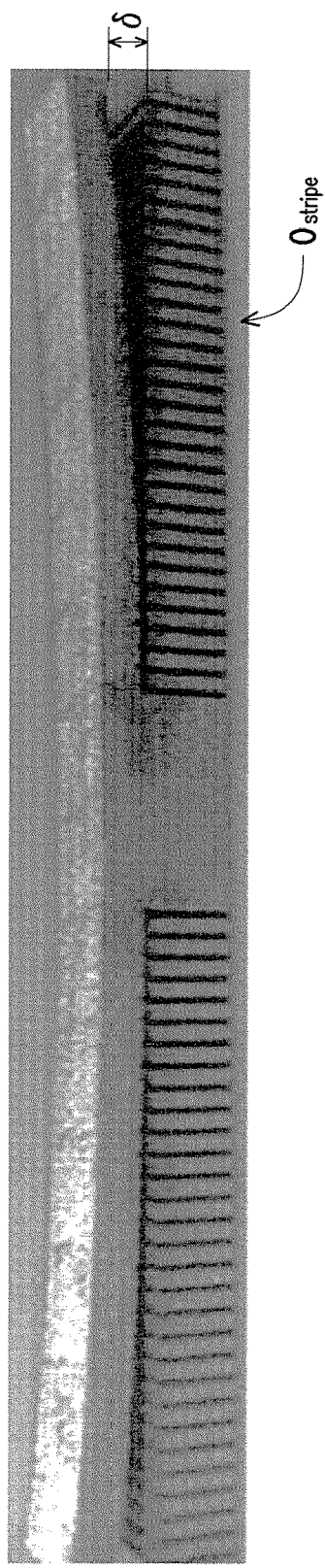
FIG. 18 is an appearance schematic diagram of a 3D object manufactured according to a conventional stripe scanning strategy.
Figure 19:
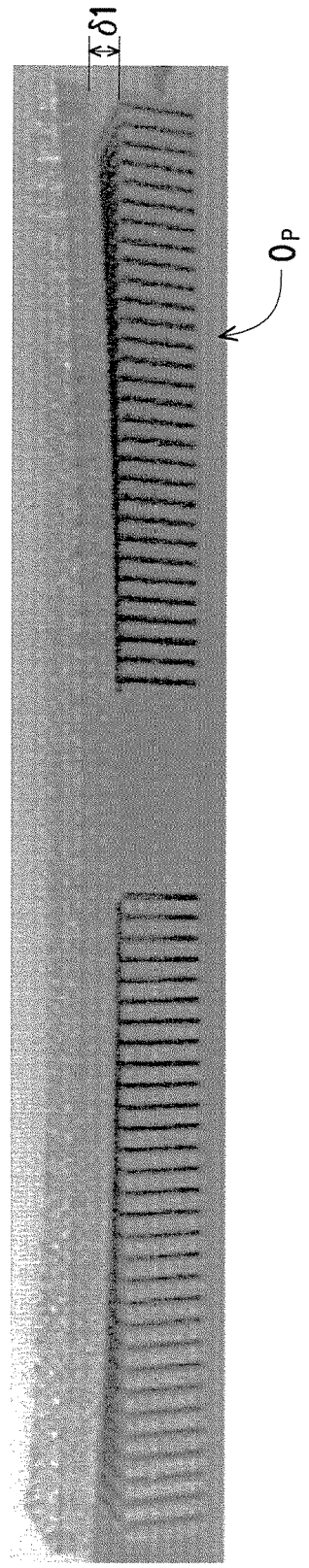
FIG. 19 is an appearance schematic diagram of a 3D object manufactured according to the additive manufacturing method for 3D object of the disclosure.

FIG. 18 is an appearance schematic diagram of a 3D object manufactured according to a conventional stripe scanning strategy. FIG. 19 is an appearance schematic diagram of a 3D object manufactured according to the additive manufacturing method for 3D object of the disclosure.

Referring to FIG. 18 and FIG. 19, it is known that compared to the conventional stripe scanning strategy, the additive manufacturing method for 3D object of the disclosure adopts the 3D arrangement method of the truncated octahedrons 400 shown in FIG. 3, FIG. 4, FIG. 5A-FIG. 5C to achieve a density close to 100%, and a deformation amount caused by the thermal stress is greatly decreased, i.e. a deformation amount δ of the conventional 3D object shown in FIG. 18 is greater than a deformation amount δ1 of the 3D object of the disclosure shown in FIG. 19.

Figure 20:
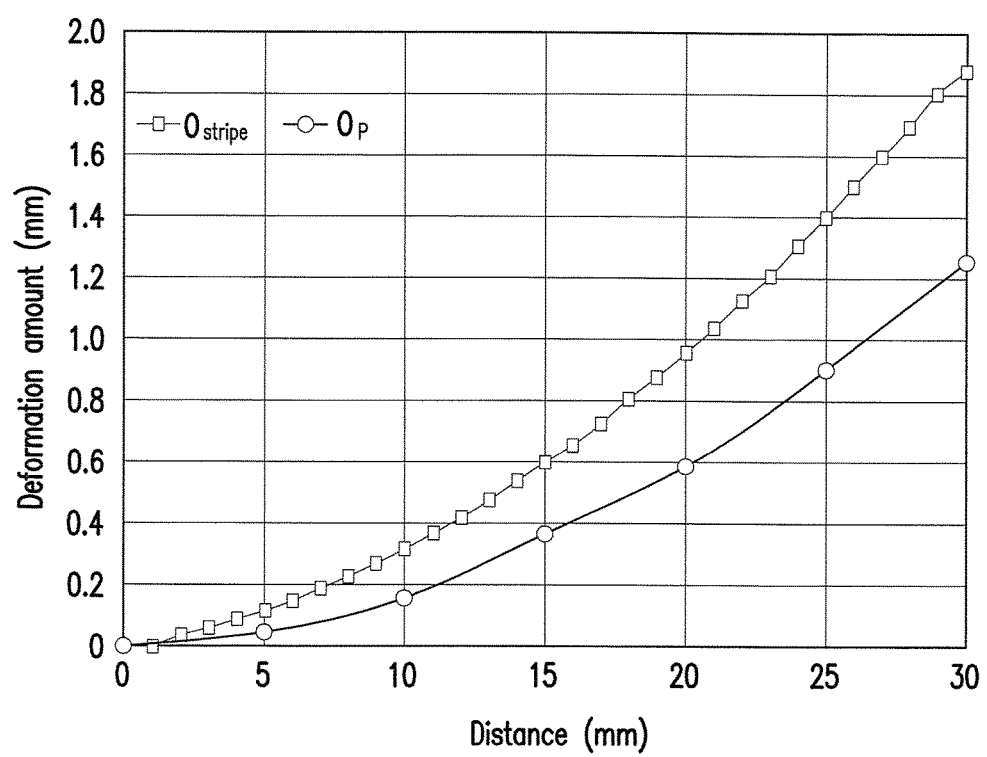
FIG. 20 is a comparison diagram of measured values of deformation amounts of a 3D object obtained according to the conventional stripe scanning strategy and deformation amounts of the 3D object of the disclosure.

FIG. 20 is a comparison diagram of measured values of deformation amounts of a 3D object obtained according to the conventional stripe scanning strategy and deformation amounts of the 3D object of the disclosure. Referring to FIG. 20, at a distance of 30 mm, a maximum deformation amount of a 3D object $O_{stripe}$ obtained according to the conventional stripe scanning strategy is 1.94 mm, and a maximum deformation amount of a 3D object $O_p$ of the disclosure is 1.22 mm. Therefore, the maximum deformation amount of the 3D object $O_p$ of the disclosure is decreased by about 37%, i.e. (1.94−1.22)/1.94*100%=37%, and such value is three times greater than a decreasing percentage (which is about 10%) of a deformation amount of the 3D object in a preheating processing (200° C.).

Therefore, an edge tensile stress value of the 3D object of the disclosure can be smaller than a stress damage threshold of a support structure, such that damage and deformation of the support structure can be greatly decreased during the manufacturing process. In this way, stability and a yield for manufacturing the 3D object are improved.

Comparison Example

Figure 21:
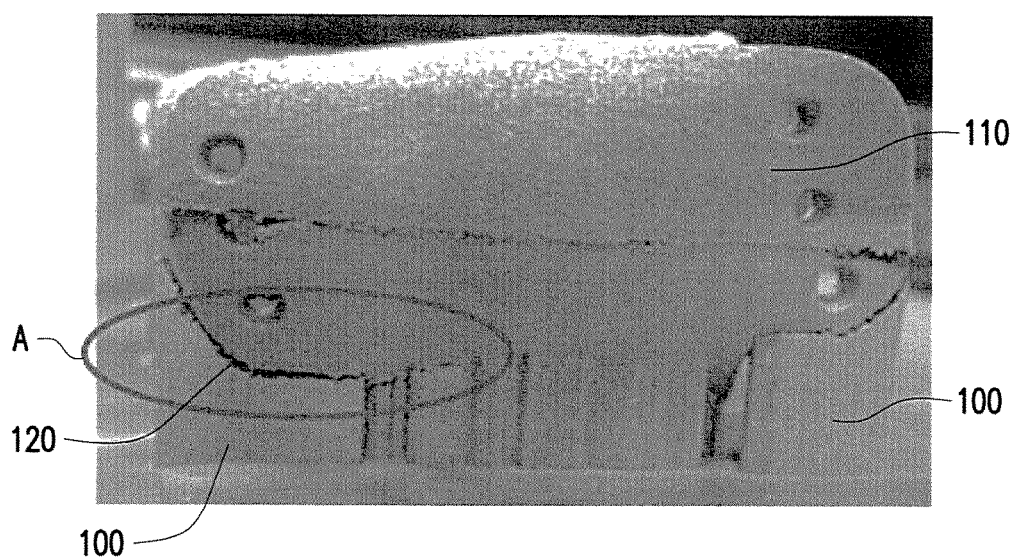
FIG. 21 is a schematic diagram of a support structure used for supporting the 3D object and damaged due to the thermal stress, in which the support structure is manufactured by using the conventional stripe scanning strategy.

FIG. 21 is a schematic diagram of a support structure used for supporting the 3D object and damaged due to the thermal stress, in which the support structure is manufactured by using the conventional stripe scanning strategy. Referring to FIG. 21, when the 3D object 110 is manufactured by using the conventional stripe scanning strategy, the support structure 100 with a poor mechanical property is manufactured at the same time, and the support structure 100 is used for supporting the 3D object 110. After manufacturing of the 3D object 110 is completed, the support structure 100 is removed.

Since the thermal stress is accumulated between a plurality of the mutually stacked construction layers, the 3D object 110 is deformed due to accumulation of the thermal stress, and the support structure 100 is damaged due to uneven thermal stress to produce a crack 120 shown in a circle A.

Therefore, during the process of additive manufacturing by using the conventional stripe scanning strategy, the support structure 100 causes a high cost due to the thermal stress damage, and the damaged support structure 100 may deteriorate the quality of the 3D object 110.

However, according to the related descriptions of FIG. 18-FIG. 20, the additive manufacturing method for the 3D object of the disclosure may effectively improve defects of the 3D object caused by the thermal stress such as warping, deformation and damage of the support structure, etc.

[Structure of the 3D Object of the Disclosure]

Referring to FIG. 2, FIG. 3, FIG. 4, and FIG. 5A-FIG. 5C, the disclosure further provides a structure of the 3D object 200. The 3D object 200 is manufactured in the space S defined by the X-axis, the Y-axis and the Z-axis perpendicular to each other, where the X-axis and the Y-axis are located on the horizontal plane $P_{XY}$, and the Z-axis is perpendicular to the horizontal plane $P_{XY}$. The structure of the 3D object 200 may include a plurality of the same or different polyhedral 3D units (for example, the truncated octahedrons 400) arranged in repeat arrangement, as shown in FIG. 5B, and an included angle θ between at least one surface of each of the polyhedral 3D units and the horizontal plane $P_{XY}$ is an acute angle or an obtuse angle.

The polyhedral 3D unit can be one of a tetrahedron, a pentahedron, a hexahedron, a heptahedron, an octahedron, a truncated octahedron, a quadrangle antiprism, a hexagonal prism, an enneahedron, a decahedron, an octagonal prism, a hendecahedron, a dodecahedron, a rhombic dodecahedron, a tetrakaidecahedron, a pentadecahedron, a hexadecahedron, an octadecahedron, an icosahedron, a great rhombicuboctahedron, a truncated cube, a triacontahedron, and a combination thereof. It should be noted that the polyhedral 3D unit is not limited to the aforementioned examples.

Based on the type and amount of the adopted polyhedral 3D units, a range of the included angle θ can be an acute angle. For example, when the polyhedral 3D unit is implemented by the hexagonal prism 600 or the truncated octahedron 400, the included angle θ is 60 degrees. When the polyhedral 3D unit is implemented by the rhombic dodecahedron 500, the included angle θ is 45 degrees. In other embodiments, the range of the included angle θ can be an obtuse angle. In this case, the polyhedral 3D unit with the included angle θ of 120 degrees or 135 degrees can be used. The included angle θ is not limited to the aforementioned examples, and as long as the included angle θ is an acute angle or an obtuse angle, the technical effect of dispersing the thermal stress of the disclosure can be achieved.

Referring to the embodiment of the truncated octahedron 400 of FIG. 1, FIG. 2, FIG. 3-FIG. 6B, the additive manufacturing method for the 3D object of the disclosure is introduced according to another point of view.

The additive manufacturing method for the 3D object includes following steps: (a) providing a 3D digital model composed of a plurality of 3D units (for example, the truncated octahedrons 400 shown in FIG. 3); (b) cutting the 3D digital model into a plurality of 2D slices $P_{CS}$ (as shown in FIG. 2), wherein each of the 2D slices $P_{CS}$ comprises a plurality of slice units; and (c) performing additive manufacturing by sequentially providing an energy beam L along a scanning path covering each of the 2D slices $P_{CS}$, so as to build up the 3D object 200 by adding a plurality of construction layers M corresponding to the 2D slices $P_{CS}$ in sequence, wherein two adjacent slice units of each of the 2D slices $P_{CS}$ have the scanning paths in different scanning vectors.

Where the step (c) is to synchronously scan all of the unit cross-sections on a same 2D slices $P_{CS}$, and the slice units are, for example, the polygons 402-406 shown in FIG. 5C. Moreover, the 3D units (for example, the truncated octahedrons 400) are identical.

In another embodiment, the slice units of each of the 2D slices $P_{CS}$ are scanned by the energy beam L one-by-one. The one-by-one scanning method is also referred to as a non-synchronous scanning method.

In another embodiment, a plurality of first slice units having the scanning path in a first scanning vector and being respectively scanned by different energy beams at the same time; and a plurality of second slice units having the scanning path in a second scanning vector different from the first scanning vector and being respectively scanned by different energy beams at the same time, wherein the first slice units are scanned prior to the second slice units. Moreover, in another embodiment, a plurality of first slice units having the scanning path in a first scanning vector; and a plurality of second slice units having the scanning path in a second scanning vector different from the first scanning vector, wherein the first slice units and the second slice units are respectively scanned by different energy beams at the same time.

The aforementioned 3D units (for example, the truncated octahedrons 400 of FIG. 3) are identical. In another embodiment, a plurality of mending units (not shown) can be provided, and the mending units on missing parts at the periphery of the 3D digital model to form the 3D object, wherein a size of each of the mending units is smaller than a size of each of the 3D units. Similar content has been described in conjunction with FIG. 1 and FIG. 2, and details thereof are not repeated.

Certainly, the embodiment of the rhombic dodecahedron 500 of FIG. 7-FIG. 9B, the embodiment of the hexagonal prism 600 of FIG. 10-FIG. 12B and the embodiment of the pyritohedron 700 of FIG. 13-FIG. 14 may also support a protection range of the claims of the additive manufacturing method for the 3D object described according to the aforementioned point of view.

Moreover, referring to the embodiments of FIG. 1, FIG. 2, and FIG. 15-FIG. 17, the additive manufacturing method for the 3D object of the disclosure is introduced according to another point of view.

The additive manufacturing method for the 3D object includes following steps: (a) providing a 3D digital model composed of a plurality of first 3D units (for example, the truncated cubes 1100 shown in FIG. 17) and a plurality of second 3D units (for example, the regular octahedrons 1200 shown in FIG. 17) different from the first 3D units; (b) cutting the 3D digital model into a plurality of 2D slices $P_{CS}$ (shown in FIG. 2), wherein each of the 2D slices $P_{CS}$ comprises a plurality of first slice units corresponding to the first 3D units and a plurality of second slice units corresponding to the second 3D units; and (c) performing additive manufacturing by sequentially providing an energy beam L along a scanning path covering each of the 2D slices $P_{CS}$, so as to build up the 3D object 200 by adding a plurality of construction layers M corresponding to the 2D slices $P_{CS}$ in sequence.

The 3D units may include first 3D unit and second 3D unit as shown in FIG. 17. Certainly, the 3D units may also include first 3D units, second 3D units and third 3D units as shown in FIG. 15 and FIG. 16. Moreover, in another embodiment, the 3D units may also include a plurality of 3D units (more than three) with different shapes and sizes, and the shapes, sizes and combinations of the 3D units are not limited by the disclosure.

The step (c) includes the first slice units of each of the 2D slices $P_{CS}$ have the scanning path in a first scanning vector, and the second slice units of each of the 2D slices $P_{CS}$ have the scanning path in a second scanning vector different from the first scanning vector.

To be specific, the slice units of each of the 2D slices $P_{CS}$ are scanned by the energy beam L one-by-one. The one-by-one scanning method is also referred to as a non-synchronous scanning method.

Moreover, the first slice units of each of the 2D slices $P_{CS}$ are respectively scanned by different energy beams at the same time, the second slice units of each of the 2D slices $P_{CS}$ are respectively scanned by different energy beams at the same time, and the first slice units are scanned prior to the second slice units. In another embodiment, the first slice units and the second slice units of each of the 2D slices $P_{CS}$ are respectively scanned by different energy beams at the same time.

In summary, in the disclosure, a plurality of 3D units or polyhedral 3D units are used to establish the 3D digital model, which is a technical feature unrevealed by other 3D printing methods. Based on the 3D structure of the 3D units or the polyhedral 3D units, a technical effect of dispersing the thermal stress is achieved. Therefore, by using the additive manufacturing scanning strategy of the 3D units or the polyhedral 3D units, the thermal stress deformation is greatly mitigated, so as to improve shaping quality and stability of the additive manufacturing, and maintain a mechanical strength along each axial direction in the structure of the 3D object.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An additive manufacturing method for a three-dimensional (3D) object, the additive manufacturing method comprising:
    (a) providing a 3D digital model of the 3D object;
    (b) dividing the 3D digital model of the 3D object into repeat arrangement of at least one type of polyhedral 3D units, wherein an included angle between at least one surface of each of the polyhedral 3D units and an X-Y plane is an acute angle or an obtuse angle;
    (c) cutting the 3D digital model along a Z-axis into a plurality of two-dimensional (2D) slices;
    (d) defining a scanning path covering one of the 2D slices, wherein each of the 2D slices is composed of a plurality of polygons and the polygons of each of the 2D slices comprise:
        a plurality of first polygons having the scanning path in a first scanning vector and being able to be respectively scanned by different energy beams at the same time; and
        a plurality of second polygons having the scanning path in a second scanning vector different from the first scanning vector and being able to be respectively scanned by different energy beams at the same time, wherein the first polygons are scanned prior to the second polygons;
    (e) providing an energy beam to a material on a working plane along the scanning path to form a construction layer corresponding to the one of the 2D slices; and
    (f) repeating the steps (d) and (e) to build up the 3D object by adding a plurality of construction layers in sequence,
    wherein step (a) to step (d) are performed in a mathematical space, and
    step (e) is performed in a physical space.

2. The additive manufacturing method as claimed in claim 1, wherein the included angle is 60 degrees or 120 degrees.

3. The additive manufacturing method as claimed in claim 1, wherein the included angle is 45 degrees or 135 degrees.

4. The additive manufacturing method as claimed in claim 1, wherein the polygons of each of the 2D slices are scanned by the energy beam one-by-one.

5. The additive manufacturing method as claimed in claim 1, wherein the polyhedral 3D unit is selected from a tetrahedron, a pentahedron, a hexahedron, a heptahedron, an octahedron, a truncated octahedron, a quadrangle antiprism, a hexagonal prism, an enneahedron, a decahedron, an octagonal prism, a hendecahedron, a dodecahedron, a rhombic dodecahedron, a tetrakaidecahedron, a pentadecahedron, a hexadecahedron, an octadecahedron, an icosahedron, a great rhombicuboctahedron, a truncated cube, a triacontahedron, and a combination thereof.

6. The additive manufacturing method as claimed in claim 1, wherein the steps (e) and (f) adopt an additive manufacturing technique of powder bed melting, comprising selective laser sintering (SLS), selective laser melting (SLM), direct metal laser sintering (DMLS) or electro beam melting (EBM).

7. The additive manufacturing method as claimed in claim 1, wherein the steps (e) and (f) adopt an additive manufacturing technique of direct energy deposition, comprising laser engineering net shaping (LENS) and 3D laser cladding.

8. The additive manufacturing method as claimed in claim 1, wherein a power density of the energy beam is smaller than or equal to $10^{12}$ W/cm$^3$.

9. An additive manufacturing method for a 3D object, comprising:
    (a) providing a 3D digital model composed of a plurality of 3D units;
    (b) cutting the 3D digital model into a plurality of 2D slices, wherein each of the 2D slices comprises a plurality of slice units; and
    (c) performing additive manufacturing by sequentially providing an energy beam along a scanning path covering each of the 2D slices, so as to build up the 3D object by adding a plurality of construction layers corresponding to the 2D slices in sequence, wherein two adjacent slice units of each of the 2D slices have the scanning path in different scanning vectors, wherein the slice units of each of the 2D slices comprise:
        a plurality of first slice units having the scanning path in a first scanning vector and being respectively scanned by different energy beams at the same time; and
        a plurality of second slice units having the scanning path in a second scanning vector different from the first scanning vector and being respectively scanned by different energy beams at the same time, wherein the first slice units are scanned prior to the second slice units,
    wherein step (a) to step (b) are performed in a mathematical space, and step (c) is performed in a physical space.

10. The additive manufacturing method as claimed in claim 9, wherein the first slice units and the second slice units are respectively scanned by different energy beams at the same time.

11. The additive manufacturing method as claimed in claim 9, wherein the 3D units are identical.

12. The additive manufacturing method as claimed in claim 9, further comprising:
    providing a plurality of mending units on missing parts at periphery of the 3D digital model to form the 3D object, wherein a size of each of the mending units is smaller than a size of each of the 3D units.

13. An additive manufacturing method for a 3D object, comprising:
    (a) providing a 3D digital model composed of a plurality of first 3D units and a plurality of second 3D units different from the first 3D units;
    (b) cutting the 3D digital model into a plurality of 2D slices, wherein each of the 2D slices comprises a plurality of first slice units corresponding to the first 3D units and a plurality of second slice units corresponding to the second 3D units; and
    (c) performing additive manufacturing by sequentially providing an energy beam along a scanning path covering each of the 2D slices, so as to build up the 3D object by adding a plurality of construction layers corresponding to the 2D slices in sequence, wherein the first slice units of each of the 2D slices have the scanning path in a first scanning vector, and the second slice units of each of the 2D slices have the scanning path in a second scanning vector different from the first scanning vector, the first slice units of each of the 2D slices are respectively scanned by different energy beams at the same time, the second slice units of each of the 2D slices are respectively scanned by different energy beams at the same time, and the first slice units are scanned prior to the second slice units.

14. The additive manufacturing method as claimed in claim 13, wherein the slice units of each of the 2D slices are scanned by the energy beam one-by-one.

15. The additive manufacturing method as claimed in claim 1,
wherein the first polygons and the second polygons are respectively scanned by different energy beams at the same time.

16. The additive manufacturing method as claimed in claim 9, wherein the slice units of each of the 2D slices are scanned by the energy beam one-by-one.

17. The additive manufacturing method as claimed in claim 13, wherein the first slice units and the second slice units of each of the 2D slices are respectively scanned by different energy beams at the same time.

18. An additive manufacturing method for a 3D object, the additive manufacturing method comprising:
(a) providing a 3D digital model of the 3D object;
(b) dividing the 3D digital model of the 3D object into repeat arrangement of at least one type of polyhedral 3D units, wherein an included angle between at least one surface of each of the polyhedral 3D units and an X-Y plane is an acute angle or an obtuse angle;
(c) cutting the 3D digital model along a Z-axis into a plurality of two-dimensional (2D) slices, wherein each edge of one of the plurality of 2D slices on one side of one of the polyhedral 3D units adjoins an edge of another one of the plurality of 2D slices to a different edge on another one of the polyhedral 3D units;
(d) defining a scanning path covering one of the 2D slices;
(e) providing an energy beam to a material on a working plane along the scanning path to form a construction layer corresponding to the one of the 2D slices; and
(f) repeating the steps (d) and (e) to build up the 3D object by adding a plurality of construction layers in sequence,
wherein step (a) to step (d) are performed in a mathematical space, and step (e) is performed in a physical space.

* * * * *